(12) United States Patent
Ehrlich

(10) Patent No.: US 8,807,052 B2
(45) Date of Patent: Aug. 19, 2014

(54) KEYBOARD AND TRACKPAD SUPPORT APPARATUS

(71) Applicant: Jake Ehrlich, San Francisco, CA (US)

(72) Inventor: Jake Ehrlich, San Francisco, CA (US)

(*) Notice: Subject to any disclaimer, the term of this patent is extended or adjusted under 35 U.S.C. 154(b) by 0 days.

(21) Appl. No.: 13/660,927

(22) Filed: Oct. 25, 2012

(65) Prior Publication Data

US 2014/0117189 A1 May 1, 2014

(51) Int. Cl.
*A47B 23/00* (2006.01)
*G06F 3/033* (2013.01)
*G06F 3/02* (2006.01)
*G06F 3/039* (2013.01)

(52) U.S. Cl.
CPC .............. *A47B 23/00* (2013.01); *G06F 3/0395* (2013.01); *G06F 3/02* (2013.01); *Y10S 248/918* (2013.01)
USPC .............. 108/43; 248/118; 248/444; 248/918

(58) Field of Classification Search
USPC ........... 248/118, 118.1, 118.3, 118.5, 346.03, 248/346.06, 444, 917–918; 361/680, 683, 361/679.08, 679.55, 679.19; 312/208.3, 312/223.3; 108/43, 143; 400/715; D14/457; D10/126
See application file for complete search history.

(56) References Cited

U.S. PATENT DOCUMENTS

| | | | | |
|---|---|---|---|---|
| 2,979,990 A | * | 4/1961 | Alexander | 359/879 |
| 4,709,972 A | * | 12/1987 | LaBudde et al. | 312/208.3 |
| D302,399 S | * | 7/1989 | Robert | D10/126 |
| 5,509,628 A | * | 4/1996 | Noble | 248/118 |
| 5,513,824 A | * | 5/1996 | Leavitt et al. | 248/118.3 |
| 6,025,986 A | * | 2/2000 | Sternglass et al. | 361/679.08 |
| 6,876,546 B2 | * | 4/2005 | Tsao | 361/679.08 |
| 7,240,623 B2 | * | 7/2007 | Jarke et al. | 108/43 |
| D686,630 S | * | 7/2013 | Ehrlich | D14/457 |
| 2002/0113530 A1 | * | 8/2002 | Hatch et al. | 312/223.3 |

* cited by examiner

*Primary Examiner* — Tan Le
(74) *Attorney, Agent, or Firm* — David Olsen

(57) ABSTRACT

An apparatus for securely and ergonomically supporting a wireless keyboard and wireless trackpad. The apparatus can include a platform and chassis. The trapezoidal shaped chassis provides an ergonomic height and angle for keyboard and trackpad use on a flat surface and the trapezoidal shaped chassis sits securely in one's lap.

14 Claims, 3 Drawing Sheets

KEYBOARD AND TRACKPAD SUPPORT APPARATUS

CROSS REFERENCE TO OTHER APPLICATIONS

This application claims priority under 35 U.S.C. §119(e) of the U.S. provisional patent application Ser. No. 61/628,167 filed on Oct. 25, 2011, and titled "Tablet Stand, Trackpad and Keyboard Platform." The provisional patent application Ser. No. 61/628,167 filed on Oct. 25, 2011, and titled "Tablet Stand, Trackpad and Keyboard Platform." is hereby incorporated by reference.

FIELD OF INVENTION

The present invention relates to computer peripheral device accessories. In particular, accessories that provides a platform for a wireless keyboard device and a wireless trackpad device.

BACKGROUND OF THE INVENTION

Some computer systems are provided with a separate keyboard and separate trackpad device, often being wirelessly connected to a computer. Having to use the devices separately is not always a convenient or ergonomic when utilized separately. Further, the portability of the two devices is diminished and can be awkward. Also, it is very difficult to utilize the keyboard and trackpad on a person's lap without having a flat surface to support the device.

What is needed is a device that can hold the trackpad and keyboard securely in an ergonomic configuration and enable easy use of a keyboard and a trackpad on a person's lap.

SUMMARY OF THE INVENTION

An apparatus for holding a wireless keyboard and wireless trackpad is claimed. The apparatus comprises a platform and a chassis. The platform has a substantially rectangular shape with a front aperture and a rear indentation. The platform surface is substantially flat and forms a platform plane. The aperture is rectangular and is substantially centered along the one side of the platform. The aperture is shaped to receive and surround a trackpad.

The aperture can be configured to provide a tight fit of the trackpad or configured for insertion into the chassis. Preferably the aperture has the same outline shape as the trackpad and can have dimensions up to 110% larger than the dimensions of the trackpad.

The rear indentation in the platform supports the keyboard. The width of the indentation area can be 100% to 120% of the keyboard width and substantially centered along the opposing side upon which the aperture is centered. Further, the rear indentation is configured to support a keyboard substantially in the plane of the platform surface. Preferably the keyboard is supported between 0.5 inches below and 0.5 inches above the plane of the platform surface.

The platform includes a keyboard coupling means configured for removable coupling of the keyboard to the apparatus. The coupling means can include a structure that snaps to or around the rear portion of the keyboard. In one configuration the coupling means is one or more semicircular structure that is flexible enough to allow the battery case to snap into the semicircular structure and securely grip the battery case. Other coupling means can include a fabric with hooks and complementary loop fibers, such as Velcro®.

Either the hooks or fiber loops fabric can be coupled to the platform or chassis, and a complementary fabric configured to detachably couple to the fabric with hooks or fibers and attached or coupled to the keyboard. In another embodiment, the coupling means is by magnets that are placed in the recessed area in positions that corresponds with ferromagnetic areas on the keyboard. Additionally, the coupling means could include clamps along one or more of the edges of the recessed area and configured to couple, connect, or attach to the keyboard.

Another coupling means includes the use of a sticky material connected, coupled, or attached to the recessed area. Exemplar of such material is double-sided-tape, or a thicker material where the exposed side is parallel to the plane of the platform and is configured at a height where the keyboard will detachably stick to the keyboard.

The chassis is coupled, connected or attached to the platform. The chassis includes a trapezoidal shaped protrusion where the shorter parallel side of the protrusion is substantially centered along the side on which the platform aperture is centered. The chassis can include a cavity collocated below the platform aperture on which the trackpad rests. Further, the chassis cavity can include a trackpad coupling device that allows the trackpad to be removed and recoupled to the apparatus. Preferably the cavity is configured to support the trackpad substantially in the platform plane. Preferably, the trackpad is supported between the platform plane to 3.0 inches below the platform plane.

In some embodiments the platform aperture extends into the recessed area. Preferably, for trackpads with a battery pack at the top of the trackpad, the platform aperture extends sufficiently into the recessed area such that when the keyboard is installed onto the apparatus, the keyboard overlaps the part of the trackpad that includes the battery pack but not any of the trackpad user input area.

In some embodiments, the edges around the aperture are rounded and curve down to meet the plain of the trackpad. The chassis can include one or more apertures located under the platform aperture which can sufficiently large enough for a finger to push the trackpad up and release it from the coupling means.

The protrusion can be trapezoidly shaped with two parallel sides. The longer parallel side is located along the rear of the apparatus. The corners of the protrusion can be rounded. The trapezoidal protrusion is designed to hold the apparatus at an ergonomic height above a work surface. Preferably the trapezoidal protrusion has a depth such that the average height of the platform wrist rest surface plane is between 0.25 and 2.0 inches. Preferably the acute angle of the trapezoidal shape is between 50-85 degrees.

The protrusion can be configured so the apparatus sits at an ergonomic tilt angle when resting on a level surface. The tilt angle is determined by the protrusion having a greater depth along the longer parallel side than the depth along the opposing side. The tilt of the platform can be between 3 and 30 degrees when sitting on a level surface.

DETAILED DESCRIPTION OF THE INVENTION

The following description of the invention is provided as an enabling teaching of the invention. Those skilled in the relevant art will recognize many changes can be made to the embodiment described, while still attaining the beneficial results of the present invention. It will also be apparent that some of the desired benefits of the present invention can be attained by selecting some of the features of the present invention without utilizing other features. Accordingly, those skilled in the art will recognize many modifications and adaptations to the present invention are possible and can even be desirable in certain circumstances, and are a part of the present invention. Thus, the following description is provided as illustrative of the principles of the present invention and not a limitation thereof.

The apparatus is comprised of a platform for supporting a wireless keyboard and wireless trackpad and a chassis. The chassis is configured to position the keyboard and trackpad at an ergonomic height and angle for typing and user inputs. The apparatus tilts the keyboard for typing. The chassis is a trapezoidal shape for sitting in a person's lap and so that the non-parallel sides of the trapezoid tend to parallel the sides of the legs. Thus, the use of the keyboard and trackpad is more comfortable and secure. The apparatus is configured for easy removal of the keyboard and track pad for separate use, replacement of the keyboard or trackpad, or replacing batteries. Further, the apparatus is configured for accessing the keyboard and trackpad power switches while coupled, connected or attached to the apparatus.

The platform and chassis can be composed of one component or multiple components coupled, connected, or attached together. The components can be formed of various plastics, including but not limited to polycarbonate and Plexiglas™ (Polymethyl methacrylate), glass, wood, metals including but not limited to aluminum, or a combination thereof.

The apparatus also includes a means for detachably coupling a wireless keyboard and trackpad to the apparatus. The means for detachably coupling the keyboard and means for detachably coupling the trackpad can be part of that chassis and platform, or attached to the chassis platform, part of, or attached to the chassis, or part of, or attached to a both the chassis and platform.

The chassis can include one or more apertures to access and help release and remove the keyboard, the trackpad, or both. Further, the apertures can provide access to the keyboard or trackpad power buttons or access for the replacement of the batteries.

Figure 1:
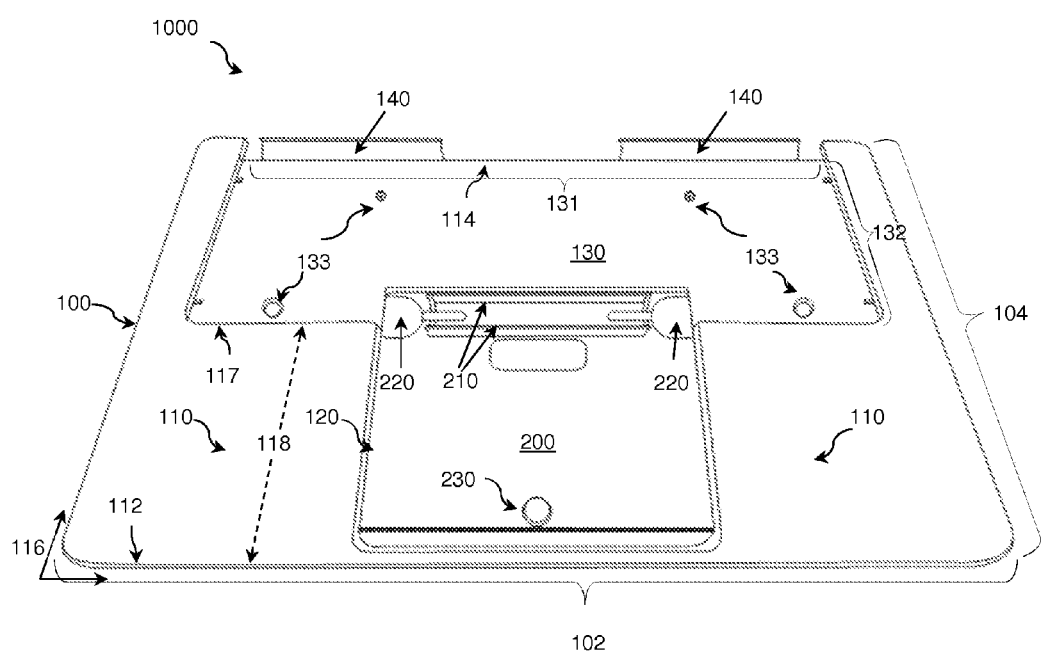
FIG. 1 shows a top front perspective view of one embodiment of keyboard and trackpad support apparatus.

Referring to FIG. 1, one embodiment of the apparatus is shown and described. In this embodiment, the apparatus 1000 is comprised of a platform 100 supported by a chassis 200. The platform 100 has a wrist rest surface 110 for ergonomically supporting the palms and hands while using the keyboard (not shown) and the trackpad (not shown). The platform is configured with front aperture 120 in which a wireless trackpad (not shown) is placed.

The rear portion of the platform 100 can include a recessed area 130 for supporting a keyboard (not shown) at an ergonomic typing height relative to the wrist rest surface 110. The recessed area 130 has a width 131 and length 132. Preferably the recessed area length 132 is shorter than the length of the keyboard so that a keyboard with a rear battery case can drop over the back edge 114 of the recess area 130 and rest parallel to the plane of the wrist rest surface 110. Further, the recessed area 130 can include one or more indentation 133 that are shaped and positioned to correspond with feet on the chassis of a keyboard and thereby providing better support and securing of the keyboard.

The platform 100 or chassis 200 can include a coupling structure that detachably couples, connects, or attaches a keyboard to the apparatus 1000. In the shown embodiment, the coupling structure 140 for the keyboard is a pair of elongated semicircular structures 140 that is part of the platform 100. The keyboard coupling structure 140 is configured to fit around a semicircular battery case that can run along the rear of a wireless keyboard. The coupling structure 140 preferably can encompass more than 180 degrees of a circular battery pack at the rear of a keyboard. Preferably the coupling structure 140 is flexible so the keyboard circular battery pack snaps into the coupling structure 140. Further, preferably the coupling structure 140 is configured to provide a tight frictional fit around the keyboard battery pack sufficient to prevent the keyboard from sliding along the coupling structure 140 or rotate when the apparatus 1000 is picked up, carried, or turned over. However, other means for coupling are contemplated and are discussed below.

The platform width 102 is preferably sized to be wider than the keyboard width for supporting a keyboard (not shown). The platform indentation 130 is sized to be the same width or up to 20% wider than the keyboard width. The indentation length 132 can be sized to be the same front to back keyboard length. Preferably the indentation length 132 does not include the full front to back keyboard length. Thus, a keyboard that has a semicircular battery pack along the back, either for batteries or to provide a tilt angle when sitting on a flat surface, can hang over the rear edge 114 of the platform so an attached keyboard lies flat and in the plane of the wrist rest surface 110.

Further, the keyboard can couple with the coupling structure 140. The chassis 200, as shown in FIG. 1, shows a trackpad coupling structure 210 for removably securing the wireless trackpad to the apparatus 1000. The a trackpad can have a semicircular battery pack running along the back side of the trackpad, providing both a tilt angle and a storage area for the batteries. The trackpad coupling structure 210 is shown as a structure that snaps around the semicircular trackpad battery pack. Other coupling structure are contemplated including, but not limited to, a detachable material such as Velcro™, magnets, sticky material, or a frictional fit along two or more of the sides of an aperture.

The chassis 200 is configured to support a wireless trackpad in a plane parallel to the wrist rest support plane 116. Preferably the wireless trackpad is supported by the chassis 200 between 0.25 inch above and 3.0 inches below the wrist rest support plane 116. The chassis can include one or more trackpad support pads 230. The pads 230 can be formed out of any flexibly resilient material. Preferably, one or more support points are provided to prevent rocking of a connected, coupled, or attached trackpad.

The chassis 200 can include one or more release apertures 220 located beneath or overlapping the platform aperture 120 for releasing a coupled, connected, or attached trackpad. Preferably the release apertures 220 are large enough for a finger to fit through and push and release the trackpad. The apertures 220 need to be between 0.5 and 2.0 inches in diameter. Further, preferably the release aperture 220 is located underneath a trackpad's circular battery case and thus providing a point to push and release the trackpad.

The recessed area 130 can include one or more recesses 133 positioned to align with feet or any other protrusion found on a keyboard.

Figure 2:
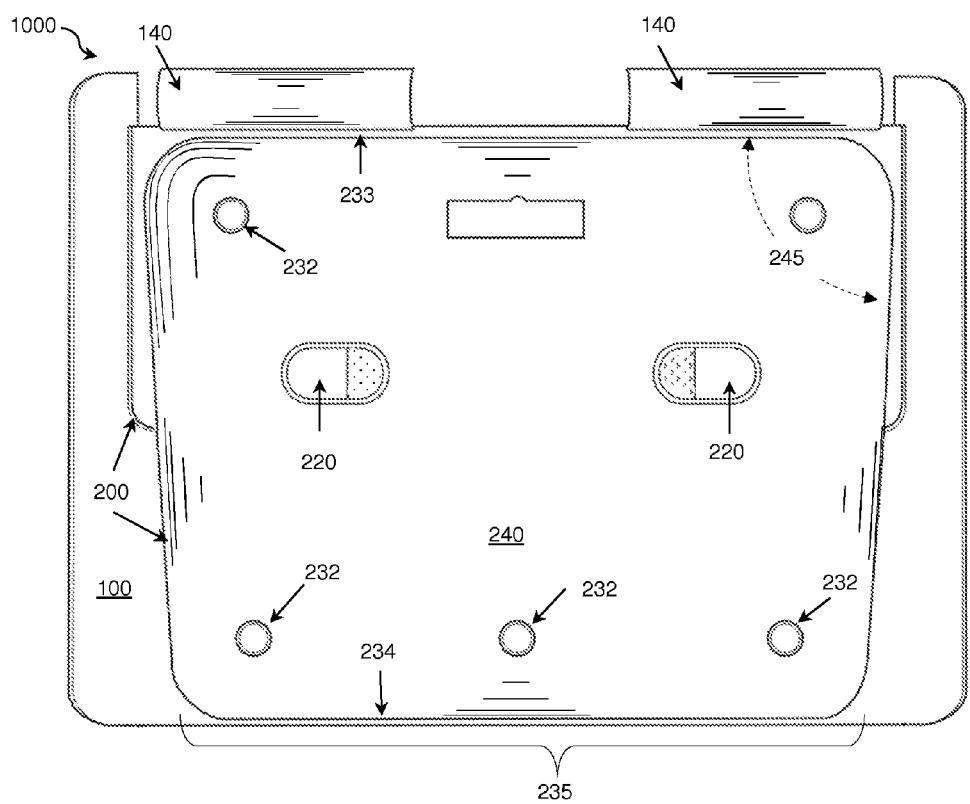
FIG. 2 shows a bottom view of one embodiment of keyboard and trackpad support apparatus.

Referring to FIG. 2, a bottom view of one embodiment of the apparatus 1000 is shown and described. The chassis 200 includes a trapezoidal protrusion 240 that provides both an average wrist rest surface height 106 for a keyboard and a trackpad and a tilt angle 104—FIG. 3 for ergonomic use of a keyboard and a trackpad. The average wrist rest surface height 106 is defined as the height above a resting surface at the mid-point 118 between the front edge 112 and the nearest indentation edge 117.

The trapezoidal protrusion 240 preferably has two parallel sides 233 234 and a width along the shorter parallel side 235. Preferably the trapezoidal protrusion corners 236 are rounded or squared off. Preferably the edges of the trapezoidal protrusion are rounded. The acute angle 245 of the trapezoidal protrusion is between 85-50 degrees. Preferably, the protrusion width 235 on the shorter parallel side is between 7 to 12 inches.

The platform 100 is coupled to the chassis 200 and preferably the platform width 102 is wider than chassis. The release apertures 220 are shown located where the top of the trackpad would be located. However, other release aperture 220 locations beneath the trackpad aperture 120 are contemplated. Further, this embodiment of the chassis 200 shows five feet 232 connected, coupled, or attached to the chassis protrusion 240. Fewer or more feet are contemplated.

Figure 3:
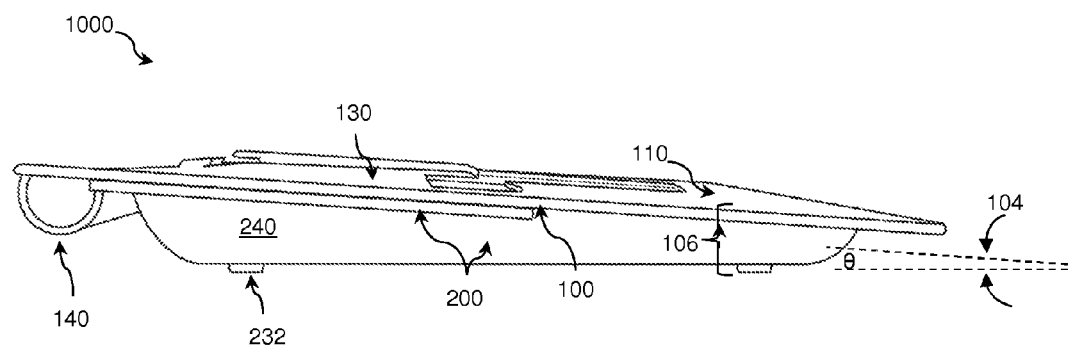
FIG. 3 shows a side view of one embodiment of the keyboard and trackpad support apparatus.

Referring to FIG. 3 a side view of one embodiment of the keyboard and trackpad support apparatus 1000 is shown and described. The trapezoidal chassis 200 as shown has rounded corners and edges. The trapezoidal protrusions longer parallel side 233—FIG. 2 is thicker than the shorter parallel side, thus generating an ergonomic tilt angle θ 104. Preferably, the tilt angle 104 is between 3 and 40 degrees.

Figure 4:
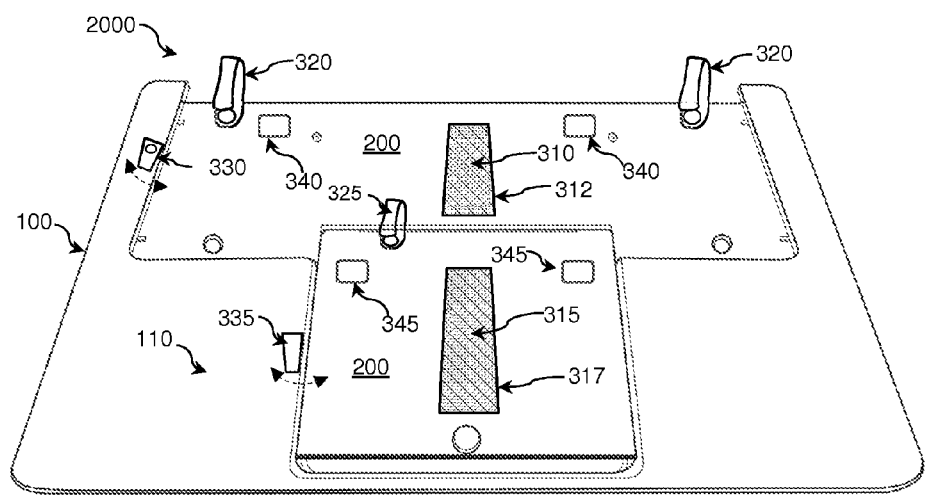
FIG. 4 shows a top, front perspective view of one embodiment of keyboard and trackpad support apparatus with alternative keyboard and trackpad coupling means.

Referring to FIG. 4 alternative means for coupling the keypad and trackpad to the apparatus 2000 are disclosed. In the shown embodiment, the recessed area for both the keyboard and trackpad are part of the chassis 200. While multiple coupling means structures are shown, only one of the means for coupling are needed. These multiple different means for coupling are shown in one drawing for convenience.

The platform 100 in FIG. 4 is coupled, connected, or attached to the chassis 200. The apparatus 2000 can include a keyboard coupling means 310 based on fiber threads and hooks. Velcro® is exemplar of such a material. The fiber coupling means comprises two complementary pieces of material. The first material has hooks and the second material is configured with loop fibers configured to attach to and detach from the hooks. Either the first or second material can be coupled, connected, or attached to the chassis 200 or platform 100. As shown in FIG. 4, the coupling fiber 310 is attached to the chassis. The complementary attachment fiber or mating hooks are coupled to a keyboard (not shown). The chassis 200 or platform 100 can include a recess 312 to attach the fiber material 310. This recess 312 positions first or second fabric 310 so the keyboard sits securely on the chassis.

The apparatus 2000 can include a trackpad coupling means 315 based on fiber threads and hooks. The same detachable fiber material described above is used as the coupling mean 315. The chassis 200 or platform 100 can include a recess 317 in which the fiber material 315 is attached to the chassis 200. This recess 317 positions a trackpad at a height to sit securely on the chassis 200 or platform. As shown in FIG. 4, the trackpad rests on the chassis 200. An alternative coupling means for the trackpad and keyboard are also shown in FIG. 4. These coupling means can be used with or in combination with prior described alternatives to the fiber or the prior described means for coupling. Though, combinations of these means for coupling are contemplated. A clip 320 can be used to attach a keyboard and another clip to attach 325 a trackpad. The clip 320 is exemplar of one embodiment of a clip in which a keyboard could slip into. The clip 320 can be wider, snap open for keyboard placement and be closed for securing a keyboard or trackpad. Optionally the clip could be located on the sides of the keyboard and rotate into a securing position after putting the keyboard onto to the chassis. The same clip 325 could be used as a coupling means for the trackpad.

An alternative clip 330 is shown coupled to the platform 100. The clip is configured to rotate over a keyboard edge after a keyboard is positioned to rest on the apparatus 1000. As shown in FIG. 4, a keyboard would rest on the chassis 200. One or more clips 325 along the edge of the platform 100 can be used. While shown to be a rotating clip 330, a different clip embodiment could be configured to slide in a channel into a securing position where the end of the clip overlies the edge of a keyboard, thereby securing it.

An alternative clip 335 for the trackpad is shown. As described in the previous paragraph, one or more clips 335 can be attached along the edge of the platform 100 and used to secure the trackpad.

Another coupling means is through the use of magnets. As shown in FIG. 4, one or more magnets 340 are imbedded or glued to the chassis 200. The magnets are placed such that they will align with another magnet within a keyboard or a ferromagnetic region of a keyboard. When the keyboard is placed on the chassis, the magnet 340 holds a keyboard in place on the apparatus.

Magnets 345 can also be used as a means for coupling a trackpad to the apparatus 1000. Magnets 345 are placed such that they will align with another magnet with a keyboard or a ferromagnetic region of a trackpad. When a trackpad is placed on the chassis, the magnet 345 holds a trackpad in place.

While only one coupling means is required for a trackpad or a keyboard, a combination of the aforementioned coupling means are contemplated.

What is claimed:

1. An apparatus for holding a wireless keyboard and wireless trackpad comprising:

a platform having a substantially rectangular shape having a front aperture and a rear indentation, wherein the platform is substantially flat and forms a wrist rest support plane, wherein the aperture is rectangular with an aperture width and aperture length, wherein the aperture is substantially centered along a platform first side and positioned closer to the first side than a second side opposing the first side, wherein the aperture is length and the aperture height is shape to be between 99% and 110% of the wireless trackpad length and the wireless trackpad width, wherein the indentation width is 100% to 120% the keyboard width, and wherein the rear indentation is substantially centered along the second side and closer to the second side than the first side;

a chassis coupled to the platform wherein the chassis has a trapezoidal shaped protrusion, wherein the shorter parallel side of the trapezoidal protrusion is substantially centered along the first side;

a keyboard coupling means configured to removably couple the keyboard to the apparatus; and a trackpad coupling means configured to removably couple to the keyboard to the apparatus.

2. The apparatus of claim 1 wherein the chassis is configured with a cavity configured to support the trackpad substantially in the wrist rest support plane.

3. The apparatus of claim 2 wherein the aperture length extends into the recessed area.

4. The apparatus of claim 3 wherein the cavity is configured to support the trackpad between the level with the wrist rest support plane of the platform and ½ inch below the wrist rest support plane.

5. The apparatus of claim 4 wherein the four edges surrounding the aperture are rounded.

6. The apparatus of claim 5 wherein the chassis contains one or more release apertures positioned to at least partially lie under the front aperture.

7. The apparatus of claim 6 wherein the release apertures are between 0.5 and 1.0 inches at the narrowest aperture dimension.

8. The apparatus of claim 1 wherein the non-parallel side of the trapezoidal protrusion are substantially equal length.

9. The apparatus of claim 8 wherein the trapezoidal protrusion has a depth 0.25 and 2 inches.

10. The apparatus of claim 9 wherein the trapezoidal protrusion has a first depth along the longer parallel side and a second depth along the shorter parallel side, wherein the first depth is greater than the second depth and configured such that the plane of the platform surface inclines between 1 and 15 degrees when the chassis is sitting on a level surface.

11. The apparatus of claim 8, wherein the trapezoidal protrusion sides form an obtuse angle and an acute angle, and wherein the acute angle of the trapezoidal protrusion is between 45-85 degrees.

12. The apparatus of claim 2 wherein the rear indentation is configured to support the wireless keyboard in the plane of the platform surface.

13. The apparatus of claim 10, wherein the rear indentation is configured to support the keyboard between 0.5 inches below the plane of the platform and 0.5 inches above plane of the platform and wherein the area of the indentation matches an outline of the keyboard.

14. The apparatus of claim 11 wherein the profile of the rear indentation is between 101% and 110% of the length and width of the keyboard.

\* \* \* \* \*